United States Patent
Tsutsumoto et al.

(10) Patent No.: US 7,134,275 B2
(45) Date of Patent: Nov. 14, 2006

(54) REGENERATION CONTROL OF DIESEL PARTICULATE FILTER

(75) Inventors: Naoya Tsutsumoto, Yokohama (JP); Junichi Kawashima, Yokosuka (JP); Makoto Otake, Yokohama (JP); Terunori Kondou, Yokohama (JP); Takao Inoue, Yokohama (JP); Shouichirou Ueno, Yokohama (JP); Toshimasa Koga, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 11/003,349

(22) Filed: Dec. 6, 2004

(65) Prior Publication Data

US 2005/0120712 A1 Jun. 9, 2005

(30) Foreign Application Priority Data

Dec. 8, 2003 (JP) .............................. 2003-409139

(51) Int. Cl.
F01N 3/00 (2006.01)
(52) U.S. Cl. .......................... 60/295; 60/274; 60/297; 60/311
(58) Field of Classification Search ................ 60/274, 60/285, 295, 297, 311
See application file for complete search history.

(56) References Cited

U.S. PATENT DOCUMENTS

| | | | |
|---|---|---|---|
| 5,044,158 | A | 9/1991 | Goerlich |
| 6,247,311 | B1 | 6/2001 | Itoyama et al. |
| 6,634,170 | B1 * | 10/2003 | Hiranuma et al. ............ 60/295 |
| 2001/0027645 | A1 | 10/2001 | Itoh et al. |
| 2003/0089102 | A1 | 5/2003 | Colignon et al. |
| 2003/0192307 | A1 | 10/2003 | Itoh et al. |
| 2004/0194450 | A1 * | 10/2004 | Tanaka et al. ................ 60/285 |
| 2005/0086933 | A1 * | 4/2005 | Nieuwstadt et al. .......... 60/297 |

FOREIGN PATENT DOCUMENTS

| | | |
|---|---|---|
| DE | 35 14 151 A1 | 10/1986 |
| EP | 1 170 473 A1 | 1/2002 |
| FR | 2 755 181 A1 | 4/1998 |
| FR | 2 829 526 A1 | 3/2003 |
| JP | 59-18220 A | 1/1984 |
| JP | 3-286120 A | 12/1991 |
| JP | 7-253012 A | 10/1995 |
| JP | 2002-168112 A | 6/2002 |
| JP | 2002-206449 A | 7/2002 |
| WO | WO 01/65080 A1 | 9/2001 |
| WO | WO 03/014542 A1 | 2/2003 |

OTHER PUBLICATIONS

U.S. Appl. No. 11/010,348, filed Dec. 14, 2004, Otake et al.

* cited by examiner

Primary Examiner—Thomas Denion
Assistant Examiner—Diem Tran
(74) Attorney, Agent, or Firm—Foley & Lardner LLP (57) ABSTRACT

A diesel particulate filter (41) traps particulate matter contained in the exhaust gas of a diesel engine (1) for a vehicle. The filter (41) is regenerated by raising the exhaust gas temperature so that the trapped particulate matter burns. A controller (31) calculates a particulate matter combustion amount PMr during regeneration, and in accordance with increases in the combustion amount PMr, raises the oxygen concentration of the exhaust gas by operating an intake throttle (42) and/or a variable nozzle (24) of a turbocharger (21). As a result, the filter (41) is held at an optimum temperature for regeneration regardless of the residual particulate matter amount, and hence the time required for regeneration can be shortened without damaging the heat resistance performance of the filter (41).

20 Claims, 11 Drawing Sheets

REGENERATION CONTROL OF DIESEL PARTICULATE FILTER

FIELD OF THE INVENTION

This invention relates to regeneration control of a filter which traps particulate matter contained in the exhaust gas of a diesel engine.

BACKGROUND OF THE INVENTION

In vehicles which run on a diesel engine, it is well-known that particulate matter contained in the exhaust gas of the engine is trapped by a diesel particulate filer (DPF) provided in the exhaust pipe to prevent the particulate matter from being discharged into the atmosphere. The particulate matter trapped by the DPF is burned by means of an operation to raise the temperature of the DPF, and thus removed from the DPF. This operation is known as DPF regeneration.

JP2002-168112A, published by the Japan Patent Office in 2002, proposes that the oxygen concentration of the exhaust gas be increased during DPF regeneration to promote combustion of the particulate matter. More specifically, the oxygen concentration of the exhaust gas is regulated in accordance with an exhaust gas pressure differential upstream and downstream of the DPF, and the elapsed time from the start of DPF regeneration processing.

SUMMARY OF THE INVENTION

If the diesel engine suddenly switches from high speed running to an idling operation while DPF regeneration is underway, the exhaust gas flow decreases, but the temperature of the DPF increases to continue burning the particulate matter. Through experiment, the present inventors examined the manner in which the temperature increase characteristic of the DPF in such a situation changes in relation to the amount of trapped particulate matter at that moment.

Figure 16:
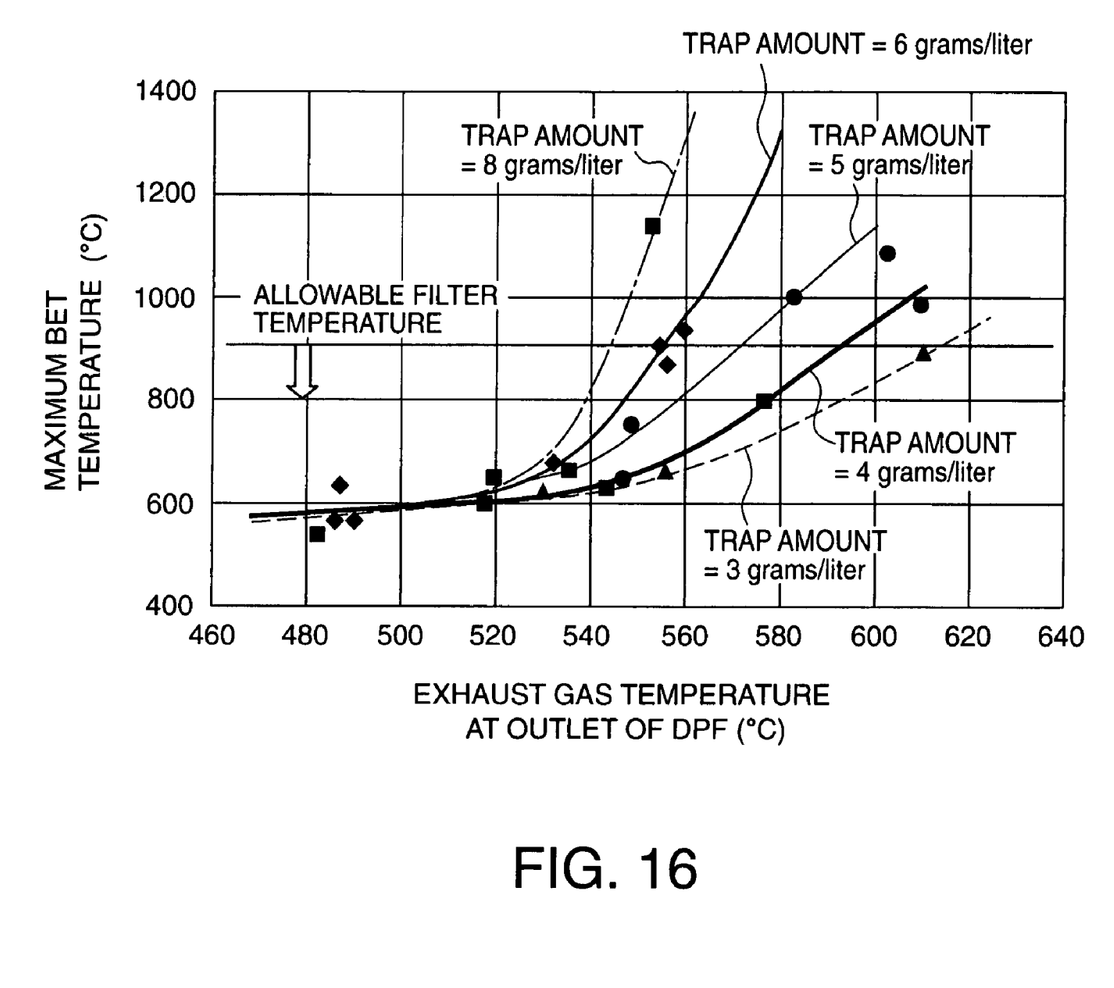
FIG. 16 is a diagram illustrating the relationship between the amount of particulate matter trapped in the DPF and a maximum temperature of the DPF, which was examined by the present inventors.

Referring to FIG. 16, it can be seen that as a result of the experiment, the maximum temperature of the DPF rises rapidly as the amount of trapped particulate matter increases. An allowable temperature is set in the DPF to prevent damage to the heat resistance performance, and when the maximum temperature exceeds the allowable temperature, the heat resistance performance is damaged, leading to a shortening of the life of the DPF. On the other hand, it is desirable that the DPF temperature be maintained at a high level within the allowable range in order to maintain the regeneration performance of the DPF.

As is disclosed in the prior art, operations to adjust the temperature of the DPF are performed by regulating the oxygen concentration of the exhaust gas. In the prior art, however, the oxygen concentration is simply adjusted in accordance with the elapsed time from the start of regeneration, without considering temperature changes in the filter during regeneration as described above. As a result, the heat resistance performance of the filter may be damaged when the maximum temperature exceeds the allowable temperature due to a change in the operation condition of the vehicle, and the time required for regeneration may increase due to a decrease in the filter temperature occurring as combustion of the particulate matter progresses.

It is therefore an object of this invention to maintain a maximum temperature of a DPF during regeneration at a high level within the range of an allowable temperature.

In order to achieve the above object, this invention provides a regeneration device for a diesel particulate filter which traps a particulate matter contained in an exhaust gas of a diesel engine. The diesel particulate filter is regenerated by burning the trapped particulate matter under a predetermined temperature condition. The regeneration device comprises a mechanism which regulates an oxygen concentration of the exhaust gas of the diesel engine, and a programmable controller which controls the mechanism. The controller is programmed to estimate a combustion amount of the particulate matter trapped in the filter, and control the mechanism such that the oxygen concentration of the exhaust gas increases as the combustion amount increases.

This invention also provides a regeneration method for the diesel particulate filter as described above. The regeneration method comprises estimating a combustion amount of the particulate matter trapped in the filter and controlling the mechanism to increase the oxygen concentration of the exhaust gas as the combustion amount increases.

The details as well as other features and advantages of this invention are set forth in the remainder of the specification and are shown in the accompanying drawings.

DESCRIPTION OF THE PREFERRED EMBODIMENTS

Figure 1:
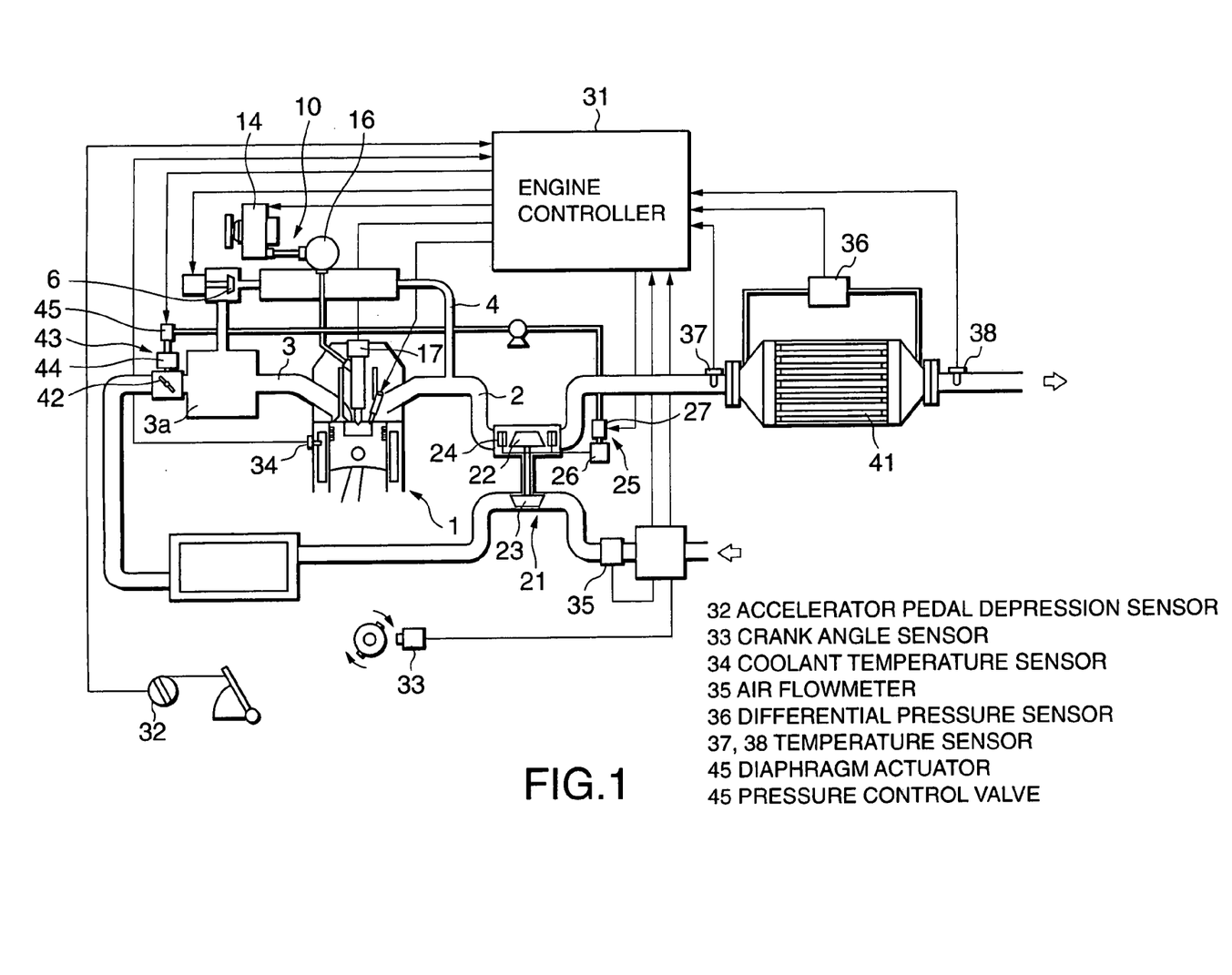
FIG. 1 is a schematic diagram of an exhaust gas purification device to which this invention is applied.

Referring to FIG. 1 of the drawings, a multi-cylinder diesel engine 1 for vehicles is provided with an exhaust passage 2 and intake passage 3. The intake passage 3 is provided with a collector part 3a to distribute intake air to each cylinder. The exhaust passage 2 and the collector part 3a are connected by an exhaust gas recirculation (EGR) passage 4.

A diaphragm type EGR valve 6 is installed in the EGR passage 4. The EGR valve 6 is operated by a pressure limiting valve and diaphragm-type actuator according to a duty signal from an engine controller 31.

The engine 1 is provided with a common rail fuel injection device 10. The fuel injection device 10 is provided with a supply pump 14, common rail (accumulator) 16 and nozzle 17 provided for every cylinder. Fuel pressurized by the supply pump 14 is distributed to each nozzle 17 via the common rail 16.

The nozzle 17 is provided with a needle valve, nozzle chamber, fuel supply passage leading to the nozzle chamber, a retainer, a hydraulic piston and a return spring.

A three-way valve is a valve which selectively connects the common rail 16 and a drain to the fuel supply passage, and in the OFF state, maintains the needle valve in the seated position by the high-pressure fuel pressure of the common rail 16 via the fuel supply passage and the nozzle chamber. In the ON state, by releasing this pressure to the drain, the needle valve is lifted and the fuel in the nozzle chamber is injected into the cylinder. The engine 1 burns the injected fuel in the cylinder by compression ignition.

The fuel injection timing of the nozzle 17 is determined by the change-over timing from OFF to ON of the three-way valve, and the fuel injection amount is determined by the duration of the ON state of the three-way valve. If the pressure of the common rail 16 is identical, the fuel injection amount will increase as the duration of the ON state increases. ON and OFF of the three-way valve are changed over by a signal from the engine controller 31.

This type of common rail fuel injection device 10 is known from U.S. Pat. No. 6,247,311.

A turbine 22 of a variable capacity turbocharger 21 is provided in the exhaust passage 2 downstream of the EGR passage 4. The variable capacity turbocharger 21 is further provided with a compressor 23 installed in the intake passage 3. The turbine 22 transforms the energy of the flow of exhaust gas into rotational energy, and drives the compressor 23 on the same axis using this rotational energy.

A variable nozzle 24 driven by an actuator 25 is installed at the scroll inlet of the turbine 22.

The actuator 25 comprises a diaphragm actuator 26 and a pressure limiting valve 27 which adjusts the control pressure to the diaphragm actuator 26, and it varies the nozzle opening so that a predetermined turbocharging pressure can be obtained in the low rotation speed region of the engine 1. Specifically, at a low rotation speed, the nozzle opening is narrowed so that the flow velocity of exhaust gas introduced into the turbine 22 is increased, and at a high rotation speed, the nozzle opening is widened so that the exhaust gas is introduced into the turbine 22 without resistance.

The pressure limiting valve 27 adjusts the pressure of the diaphragm actuator 26 according to a duty signal from the engine controller 31 so that the opening of the variable nozzle 24 is adjusted to a target nozzle opening.

An intake throttle 42 driven by an actuator 43 is formed in the inlet of the collector part 3a.

The actuator 43 comprises a diaphragm actuator 44 which drives the intake throttle 42 according to the control pressure, and a pressure limiting valve 45 which adjusts the control pressure to the diaphragm actuator 44, according to a duty signal from the engine controller 31 so that the intake throttle 42 has a target opening.

A diesel particulate filter (DPF) 41 which traps particulate matter in the exhaust gas, is installed in the exhaust passage 2 downstream of the turbine 22.

The engine controller 31 comprises a microcomputer provided with a central processing unit (CPU), read-only memory (ROM), random-access memory (RAM) and input/output interface (I/O interface).

The engine controller 31 controls the opening of the EGR valve 6, the fuel injection timing and fuel injection amount of the nozzle 17, the opening of the variable nozzle 24 of the turbocharger 21, and the opening of the intake throttle 42. The particulate matter deposited on the DPF 41 is burned occasionally via these controls, and the DPF 41 is regenerated to the state in which it can again trap particulate matter.

To perform the above control, detection signals from various sensors are inputted into the engine controller 31. These sensors include an accelerator pedal depression sensor 32 which detects a depression amount of an accelerator pedal with which the vehicle is provided, a crank angle sensor 33 which detects a rotation speed Ne and crank angle of the diesel engine 1, a coolant temperature sensor 34 which detects a cooling water temperature of the engine 1, an air flowmeter 35 which detects an intake air amount Qa of the intake passage 2, a differential pressure sensor 36 which detects a differential pressure DP upstream and downstream of the DPF 41, a temperature sensor 37 which detects an exhaust gas temperature T1 at the inlet of the DPF 41, a temperature sensor 38 which detects an exhaust gas temperature T2 at the outlet of the DPF 41, and a vehicle speed sensor 51 which detects a running speed of the vehicle.

When the particulate matter deposition amount of the DPF 41 reaches a predetermined amount, the engine controller 31 starts regenerating the DPF 41, burns the particulate matter deposited on the DPF 41, and thereby removes it from the DPF 41.

Next, referring to FIG. 2, a regeneration processing routine performed on the DPF 41 by the engine controller 31 for this purpose will be described. The engine controller 31 begins to execute this routine with the start of an operation of the diesel engine 1. As the routine ends, the next execution begins, and hence the routine is executed substantially constantly while the diesel engine 1 is operative.

First, in a step S1, the engine controller 31 estimates a trapped particulate matter amount PMi in the DPF 41 on the basis of the differential pressure detected by the differential pressure sensor 36.

Next, in a step S2, the engine controller 31 determines whether or not the trapped particulate matter amount PMi has reached a reference trapped amount PMα for regenerating the DPF 41. The reference trapped amount PMα for regenerating the DPF 41 is determined in advance through experiment.

When the trapped particulate matter amount PMi has not reached the reference trapped amount PMα for regenerating the DPF 41, the engine controller 31 repeats the processing from the step S1.

When the trapped particulate matter amount PMi reaches the reference trapped amount PMα for regenerating the DPF 41, the engine controller 31 sets a regeneration flag to unity, sets a regeneration completion flag to zero, and sets a counter value N to 1 in a step S3.

In a step S4, the engine controller 31 determines whether the counter value N is 1 or not. The counter value N reaches 1 upon the first affirmative determination result in the step S2, and hence in the step S4, the determination is affirmative. However, once the counter value is incremented in a step S21 to be described below, the counter value N becomes larger than 1, and hence the determination in the step S4 becomes negative. Thus the determination result of the step S2 becomes affirmative only when the trapped particulate matter amount PMi in the DPF 41 first reaches the reference trapped amount PMα for regeneration during an execution of the routine.

When the determination in the step S4 is affirmative, the engine controller 31 performs the processing of steps S5–S11. When the determination in the step S4 is negative, the engine controller 31 performs the processing of steps S13–S19.

Figure 3:
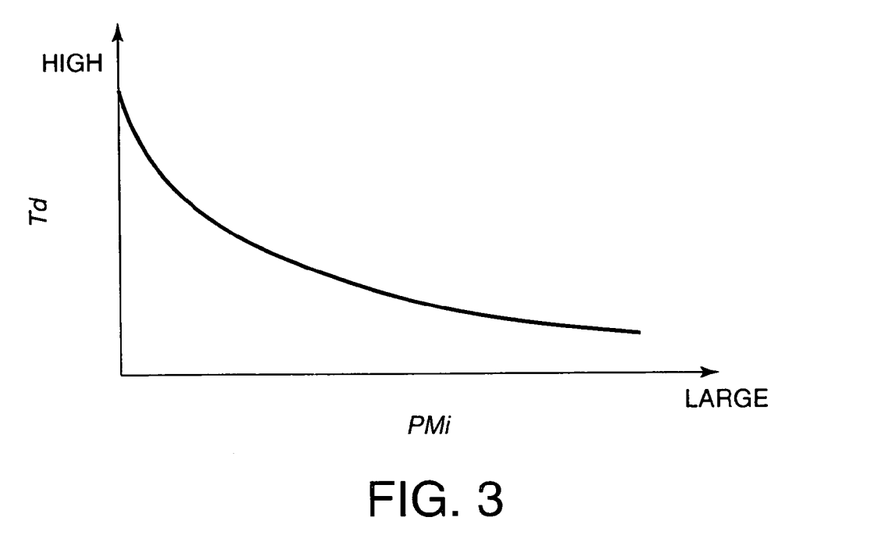
FIG. 3 is a diagram showing the characteristics of a map of a target inlet temperature, which is stored by the controller.

In the step S5, the engine controller 31 refers to a map having the characteristics shown in FIG. 3 and stored in the memory (ROM) in advance to determine a target inlet temperature Td of the DPF 41 from the trapped particulate matter amount PMi. As shown in the diagram, the target inlet temperature Td decreases as the trapped particulate matter amount PMi increases. When the trapped particulate matter amount PMi increases, a large amount of particulate matter burns during regeneration. The reason for setting the target inlet temperature Td to decrease as the trapped particulate matter amount PMi increases is to prevent the temperature of the DPF 41 from rising excessively due to an increase in temperature caused by combustion of the particulate matter. By determining the target inlet temperature Td with the trapped particulate matter amount PMi at the start of regeneration as a parameter, differences in the specifications of the diesel engine 1 and DPF 41 can be prevented from influencing the target inlet temperature Td.

Next, in a step S6, the engine controller 31 raises the exhaust gas temperature to realize the target inlet temperature Td. The exhaust gas temperature is raised by well-known control of the fuel injection device 10, e.g., post-injection, in which fuel is injected again following normal fuel injection, and retardation of the fuel injection timing. The fuel injection device 10 corresponds to the claimed temperature raising mechanism.

Next, in a step S7, the engine controller 31 estimates a bed temperature Tbed of the DPF 41 on the basis of an inlet temperature T1 of the DPF 41, detected by the temperature sensor 37, and an outlet temperature T2 of the DPF 41, detected by the temperature sensor 38. In short, the average value of the inlet temperature T1 and outlet temperature T2 may be considered as the bed temperature Tbed.

Next, in a step S8, the engine controller 31 calculates an effective regeneration time Te. The effective regeneration time Te is an integrated value of the time during which the bed temperature Tbed of the DPF 41 exceeds a target bed temperature Tx. The target bed temperature Tx is set to a temperature at which regeneration of the DPF 41 is performed reliably, or in other words a temperature at which the particulate matter is burned reliably. The target bed temperature Tx is dependent on the target inlet temperature Td, and also on the trapped particulate matter amount PMi at the start of regeneration processing.

Figure 4:
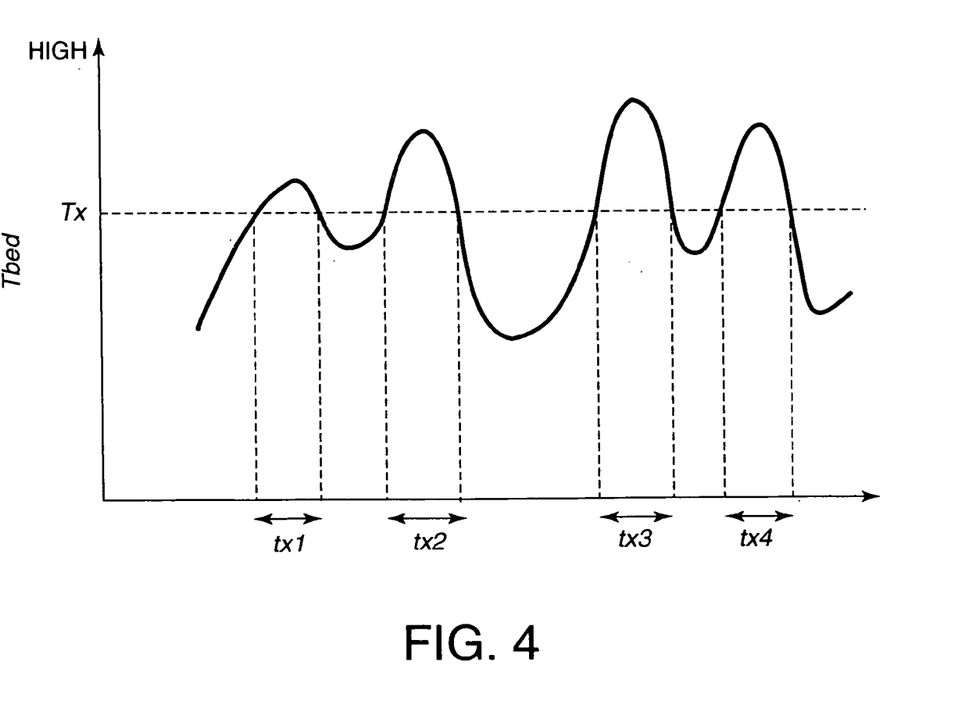
FIG. 4 is a timing chart illustrating an effective regeneration time according to this invention.

Referring to FIG. 4, the bed temperature Tbed varies in accordance with variation in the running condition. When the bed temperature Tbed is lower than the target bed temperature Tx, the particulate matter trapped by the DPF 41 may not burn completely, leaving a part of the particulate matter unburned. The effective regeneration time Te indicates the period during which complete combustion of the particulate matter actually takes place. Specifically, the effective regeneration time Te is calculated using the following equation (1).

$$Te = Tx1 + Tx2 + Tx3 + Tx4 + \ldots \quad (1)$$

By applying the effective regeneration time Te, incomplete combustion periods are excluded from the regeneration period and the particulate matter combustion amount in the DPF 41 can be estimated with a high degree of precision.

It should be noted that the method of calculating the effective regeneration time Te is not limited to Equation (1).

A second embodiment of this invention, relating to calculation of the effective regeneration time Te, will now be described.

As described above, when the bed temperature Tbed is lower than the target bed temperature Tx, unburned particulate matter remains. However, a part of the particulate matter does not remain, or in other words is burned away. The method of calculating the effective regeneration time Te according to this embodiment takes into account the particulate matter that is burned away when the bed temperature Tbed is lower than the target bed temperature Tx.

Figure 5:
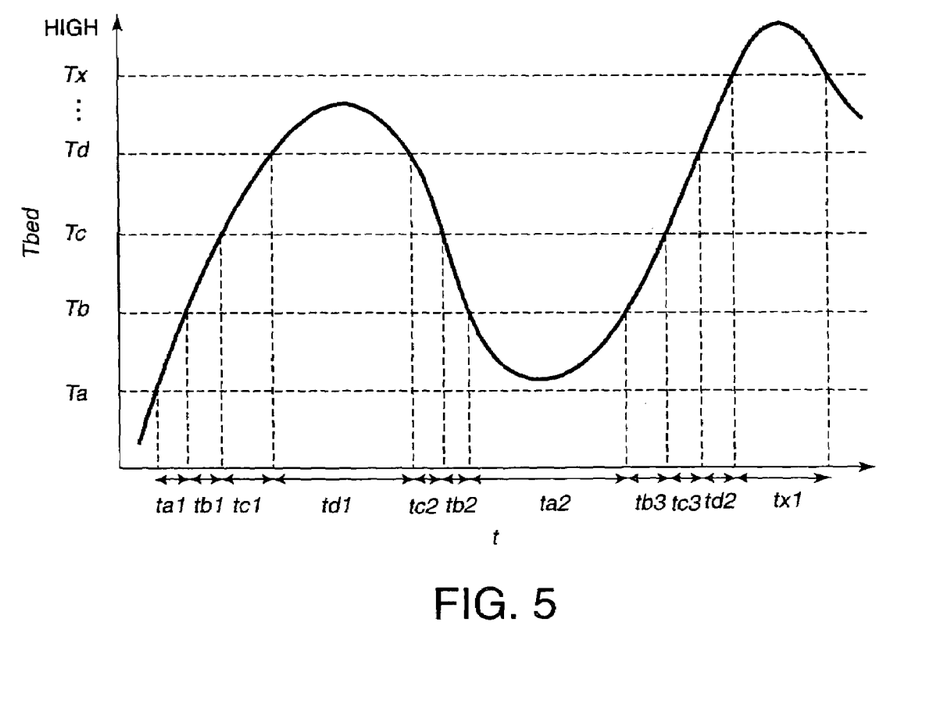
FIG. 5 is a timing chart illustrating a second embodiment of this invention, relating to the effective regeneration time.

Referring to FIG. 5, a minimum temperature for burning a part of the particulate matter in a lower temperature range than the target bed temperature Tx is set as a first temperature Ta. The temperature range from the first temperature Ta to the target bed temperature Tx is divided into a plurality of ranges. Here, four ranges are set with a second temperature Tb, a third temperature Tc, and a fourth temperature Td serving as boundaries of the ranges.

The periods during which the bed temperature Tbed is in the temperature range between the first temperature Ta and second temperature Tb are denoted as ta1, ta2. The periods during which the bed temperature Tbed is in the temperature range between the second temperature Tb and third temperature Tc are denoted as tb1, tb2, tb3. The periods during which the bed temperature Tbed is in the temperature range between the third temperature Tc and the target bed temperature Tx are denoted as td1, td2. The period during which the bed temperature Tbed is equal to or greater than the target bed temperature Tx is denoted as tx1.

Figure 6:
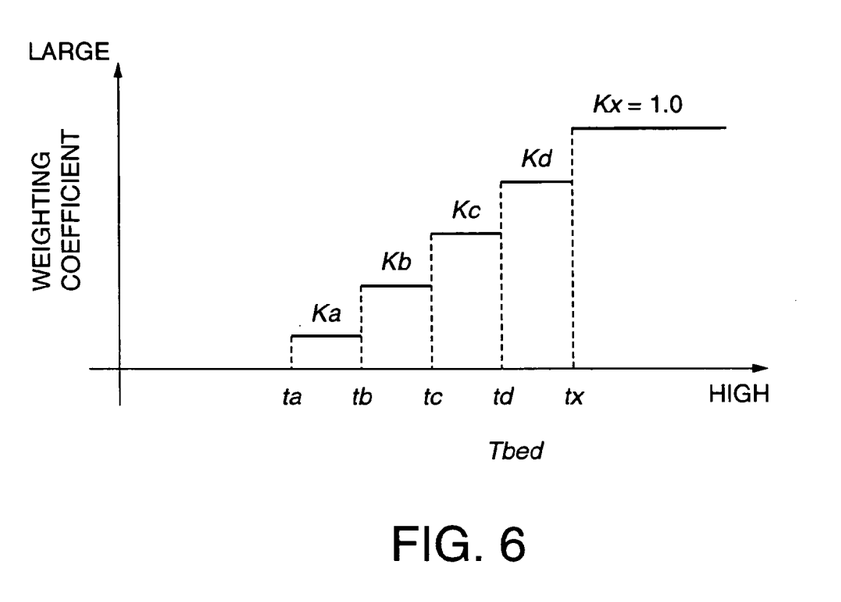
FIG. 6 is a diagram showing the characteristics of a map of a temperature coefficient relating to the effective regeneration time, which is stored by the controller.

Thus variation in the bed temperature Tbed is grasped according to the temperature range and the duration of stay in that range, and a value obtained by multiplying a weighting coefficient Ka–Kd corresponding to the temperature range, shown in FIG. 6, by the duration of stay is adopted as the effective regeneration time Te. In other words, the effective regeneration time Te is calculated using the following equation (2).

$$Te = Ka \cdot ta + Kb \cdot tb + Kc \cdot tc + Kd \cdot td + \ldots + Tx \quad (2)$$

where $ta = \Sigma tan$,
$tb = \Sigma tbn$,
$tc = \Sigma tcn$,
$td = \Sigma tdn$,
$tx = \Sigma txn$, Ka=temperature coefficient K for temperature range from temperature ta to tb, Kb=temperature coefficient K for temperature range from temperature tb to tc, Kc=temperature coefficient K for temperature range from temperature tc to td, Kd=temperature coefficient K for temperature range from temperature td to tx, and n=an integer starting from 1.

The temperature coefficient Kx when the bed temperature Tbed is equal to or greater than the target bed temperature Tx is 1.0. When the bed temperature Tbed is lower than the target bed temperature Tx, for example when ten percent of the particulate matter in the DPF 41 remains unburned and ninety percent is burned away, the temperature coefficient K is 0.9. Similarly, when fifty percent of the particulate matter in the DPF 41 remains unburned and fifty percent is burned away, the temperature coefficient K is 0.5. When the bed temperature Tbed is lower than the target bed temperature Tx, the proportion of particulate matter that is burned away decreases as the bed temperature Tbed falls. Accordingly, the five temperature coefficients Ka, Kb, Kc, Kd, Kx have a relationship of Ka<Kb<Kc<Kd<Kx, as shown in FIG. 6.

To perform the calculation shown in Equation (2), a map of the weighting coefficient K having the characteristics shown in FIG. 6 is stored in the ROM of the engine controller 31 in advance. The specific numerical values of the temperature coefficient K are set in advance through experiment.

According to this embodiment, the effective regeneration period Te is calculated in consideration of the amount of particulate matter that is burned away in the temperature range where the bed temperature Tbed is lower than the target bed temperature Tx, and hence the combustion amount of the particulate matter trapped in the DPF 41 can be estimated with a high degree of precision. The first temperature Ta corresponds to a particulate matter burnable temperature in the claims.

Figure 7:
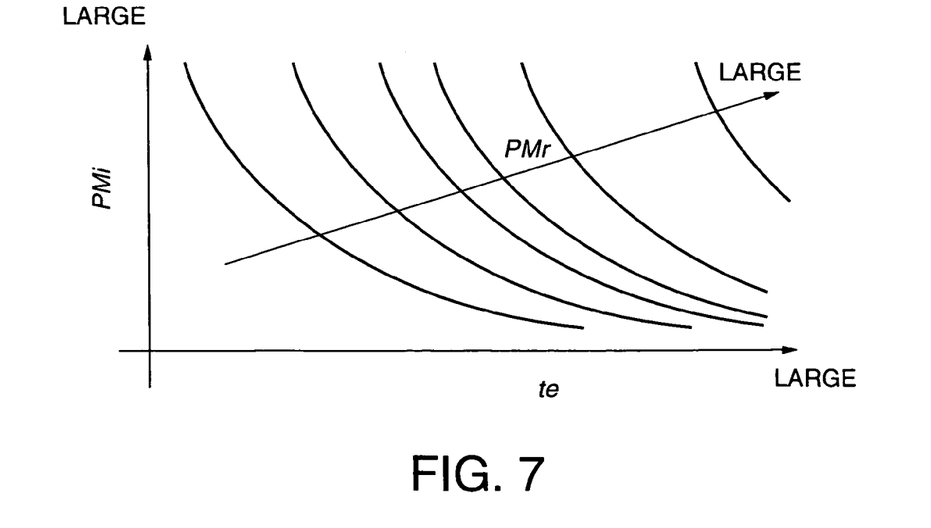
FIG. 7 is a diagram showing the characteristics of a map of a particulate matter combustion amount, which is stored by the controller.

Referring back to FIG. 2, in a step S9 the engine controller 31 refers to a map having the characteristics shown in FIG. 7 and stored in advance in the memory (ROM) to calculate a particulate matter combustion amount PMr, i.e. the amount of particulate matter trapped in the DPF 41 that is removed through combustion, from the effective regeneration time Te and the bed temperature Tbed.

Referring to FIG. 7, when the bed temperature Tbed is constant, the particulate matter combustion amount PMr increases as the effective regeneration time Te lengthens. When the effective regeneration time Te is equal, the particulate matter combustion amount PMr increases as the bed temperature Tbed rises.

Next, in a step S10, the engine controller 31 uses the following equation (3) to calculate a residual particulate matter amount PMx, i.e. the amount of particulate matter remaining in the DPF 41, from the trapped particulate matter amount PMi at the start of regeneration processing and the particulate matter combustion amount PMr.

$$PMx = PMi - PMr \qquad (3)$$

Next, in a step S11, the engine controller 31 compares the particulate matter combustion amount PMr to a predetermined target particulate matter combustion amount ΔPM. In this routine, the target inlet temperature Td of the DPF 41 is raised as regeneration progresses, as will be described in detail below. Hence whenever the particulate matter combustion amount PMr reaches the target particulate matter combustion amount ΔPM, the target inlet temperature Td is recalculated. In other words, the target particulate matter combustion amount ΔPM serves as a reference value for determining whether or not to recalculate the target inlet temperature Td.

Figure 8:
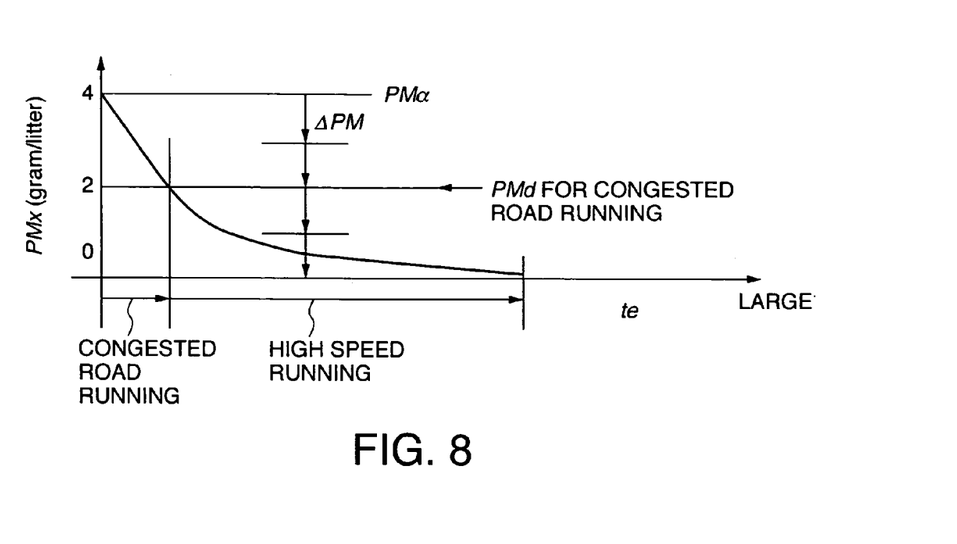
FIG. 8 is a diagram illustrating the relationship between the effective regeneration time and a residual particulate matter amount.

Referring to FIG. 8, in this embodiment the reference trapped amount PMα is set at four grams per liter, and the target particulate matter combustion amount ΔPM is set at a quarter thereof, i.e. one gram per liter. The target combustion amount ΔPM is set in accordance with the specifications of the diesel engine 1 and the DPF 41, and therefore is not limited to a quarter of the reference trapped amount PMα. It should be noted that the unit of the reference trapped amount PMα is a value obtained by dividing the mass of the particulate matter trapped in the DPF 41 in grams by the volume of the DPF 41 in liters.

When, in the step S11, the particulate matter combustion amount PMr has not reached the target combustion amount ΔPM, the engine controller 31 repeats the processing of the steps S8–S11. As a result of this repetition, the particulate matter combustion amount PMr increases and the residual particulate matter amount PMx decreases.

When the particulate matter combustion amount PMr reaches the target combustion amount ΔPM in the step S11, the engine controller 31 determines in a step S12 whether or not the residual particulate matter amount PMx has fallen to a target residual particulate matter amount PMd. The target residual particulate matter amount PMd corresponds to an allowable residual particulate matter amount at the end of regeneration of the DPF 41. This value is set in advance through experiment in accordance with the running condition of the vehicle. When the running condition corresponds to the high speed running condition that is suitable for complete regeneration of the DPF 41, the target residual particulate matter amount PMd is zero grams per liter. On the other hand, when the running condition corresponds to a congestion running condition which is not suitable for complete regeneration of the DPF 41, in this embodiment, the target residual particulate matter amount PMd is set to two grams per liter, which is half the reference trapped amount PMα of four grams per liter, as shown in FIG. 8. In other words, in the congestion running condition it is assumed that half the amount of particulate matter burned in the high speed running condition will be burned. When this condition is satisfied, the engine controller 31 temporarily halts regeneration of the DPF 41.

When the determination in the step S12 is affirmative, the engine controller 31 sets the regeneration flag to zero and sets the regeneration completion flag to unity in a step S20, and then ends the routine. The regeneration flag and regeneration completion flag are maintained in this state until the determination in the step S2 becomes affirmative during the next execution of the routine. The regeneration flag is referenced when executing an intake air amount control routine shown in FIG. 9, to be described below.

When the determination in the step S12 is negative, on the other hand, the engine controller 31 increments the counter value N in a step S21, and then returns to the step S4. When the counter value N has been incremented, the counter value becomes a value of two or more.

Hence in this case, the determination in the step S4 is negative. When the determination in the step S4 is negative, the engine controller 31 performs the processing of the steps S13–S19.

In the step S13, the engine controller 31 refers to the map having the characteristics shown in FIG. 3, which was also referred to in the step S5, to determine the target inlet temperature Td on the basis of the residual particulate matter amount PMx. It should be noted that here, the residual particulate matter amount PMx is applied instead of the trapped particulate matter amount PMi as the value of the abscissa in FIG. 3. The amount of particulate matter trapped in the DPF 41 is lower upon the execution of the step S13 than when the step S5 was executed. Hence the target inlet temperature Td obtained in the step S13 is higher than the target inlet temperature Td obtained in the step S5. The target inlet temperature Td is preferably set to a higher value every time the particulate matter combustion amount PMr reaches the target combustion amount ΔPM in order to promote combustion of the particulate matter.

The processing of steps S14–S17 is identical to the processing of the steps S6–S9.

In a step S18, the engine controller 31 calculates the residual particulate matter amount PMx using the following equation (4).

$$PMx = PMi - PMr \quad (4)$$

The particulate matter combustion amount PMr is the total amount of particulate matter burned from the start of regeneration to the present time, and not the amount of particulate matter that is burned during the processing loop of the steps S16–S19. The effective regeneration time Te determined in the step S16 is also a cumulative value from the start of regeneration to the present time.

In a step S19, the engine controller 31 determines whether or not the relationship of the following equation (5) has been established in relation to the particulate matter combustion amount PMr.

$$PMr \geq DPM \cdot N \quad (5)$$

The counter value N expresses the number of executions of the loop of the steps S8–S11 and the loop of the steps S16–S19. The counter value N is incremented every time the particulate matter combustion amount PMr reaches the target combustion amount ΔPM. The determination in the step S19 as to whether or not the loop of the steps S16–S19 should be halted is made according to whether or not the particulate matter combustion amount PMr has reached ΔPM·N.

Here, during an execution of the loop of the steps S16–S19 following an execution of the loop of the steps S8–S11, the counter value N is 2. As shown in FIG. 8, when the trapped particulate matter amount PMi at the start of DPF regeneration and the target combustion amount ΔPM are set at four grams per liter and one gram per liter respectively, the right side of Equation (5) becomes 4−1·2=2 (grams/liter). In other words, in this state the determination performed by the engine controller 31 in the step S19 becomes a determination as to whether or not the particulate matter combustion amount PMr has reached two grams per liter.

When the determination in the step S19 is negative, the processing of the steps S16–S19 is continued. When the determination in the step S19 is affirmative, the engine controller 31 performs the determination of the step S12. If, as a result, the residual particulate matter amount PMx has not fallen to the target residual particulate matter amount PMd, the counter value N is incremented in the step S21, and regeneration of the DPF 41 is continued. If the residual particulate matter amount PMx has fallen to the target residual particulate matter amount PMd, the engine controller 31 sets the regeneration flag to zero and sets the regeneration completion flag to unity in the step S20, and then ends the routine. It should be noted that after ending the routine, the engine controller 31 begins to execute the next routine immediately.

Next, referring to FIG. 9, an intake air amount control routine executed by the engine controller 31 will be described. The engine controller 31 executes this routine at ten millisecond intervals. The routine is executed with the aim of raising the oxygen concentration of the exhaust gas in accordance with increases in the particulate matter combustion amount PMr in the DPF 41.

In a step S31, the engine controller 31 determines whether or not the regeneration flag is at unity. If the regeneration flag is at unity, this indicates that regeneration of the DPF 41 is underway. In this case, the engine controller 31 executes the processing of steps S32–S34.

If, on the other hand, the regeneration flag is at zero, this indicates that regeneration of the DPF 41 is not underway. In this case, the engine controller 31 ends the routine immediately.

In the step S32, the engine controller 31 reads the particulate matter combustion amount PMr. The value thereof is the newest value calculated in the DPF regeneration routine of FIG. 2.

Figure 11A:
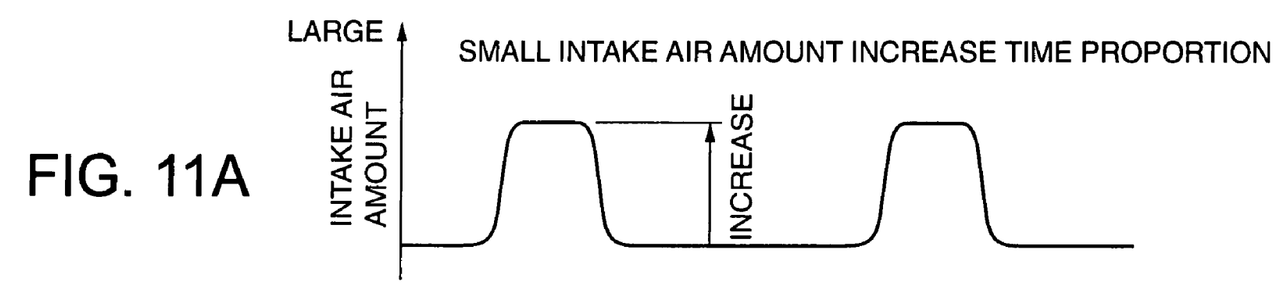
FIGS. 11A and 11B are timing charts illustrating the relationship between the intake air amount increase time proportion and the intake air amount.
Figure 11B:
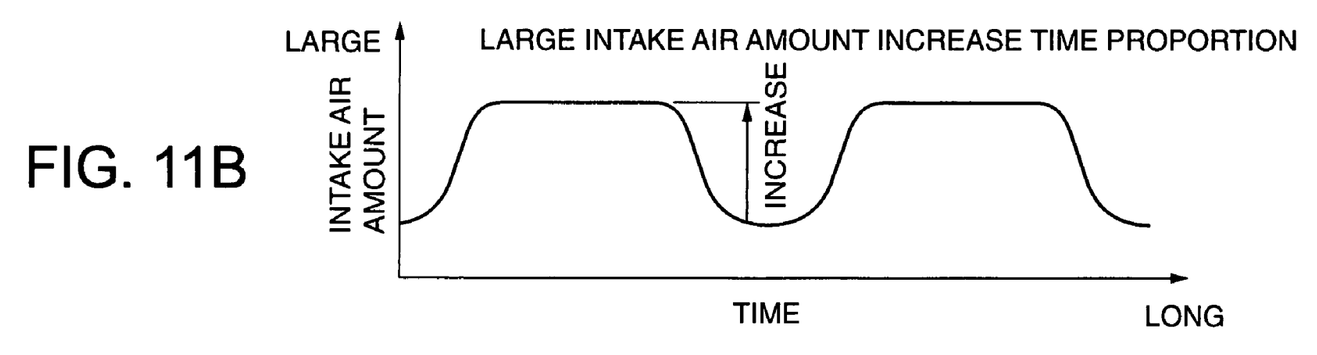
Figure 13:
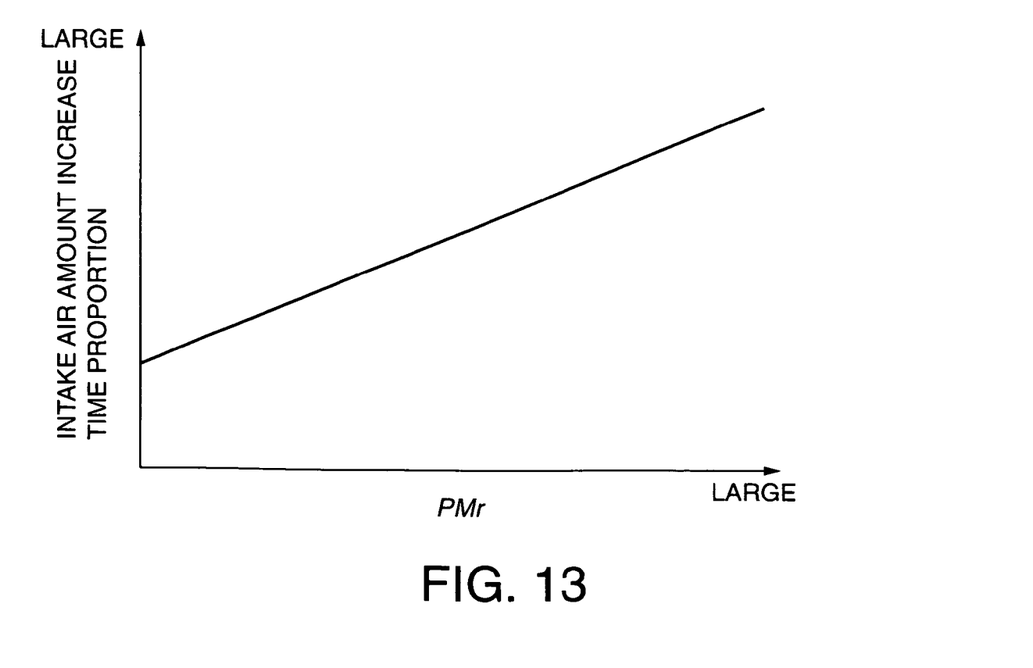
FIG. 13 is a diagram illustrating the relationship between the intake air amount increase time proportion and the particulate matter combustion amount.

In the step S33, the engine controller 31 refers to a map stored in advance in the memory (ROM) and having the characteristics shown in FIG. 13 to determine an intake air amount increase time proportion on the basis of the particulate matter combustion amount PMr. As shown in FIGS. 11A and 11B, the intake air amount increase time proportion indicates the proportion of a fixed time period that is occupied by increasing the intake air amount, and has a minimum value of zero percent and a maximum value of one hundred percent. An allowable filter temperature value is set as an upper temperature limit at which the heat resistance performance of the DPF 41 is not affected. The value thereof is dependent on the specifications of the DPF 41. Here, the allowable filter temperature value is set at 900 degrees centigrade.

Figure 10:
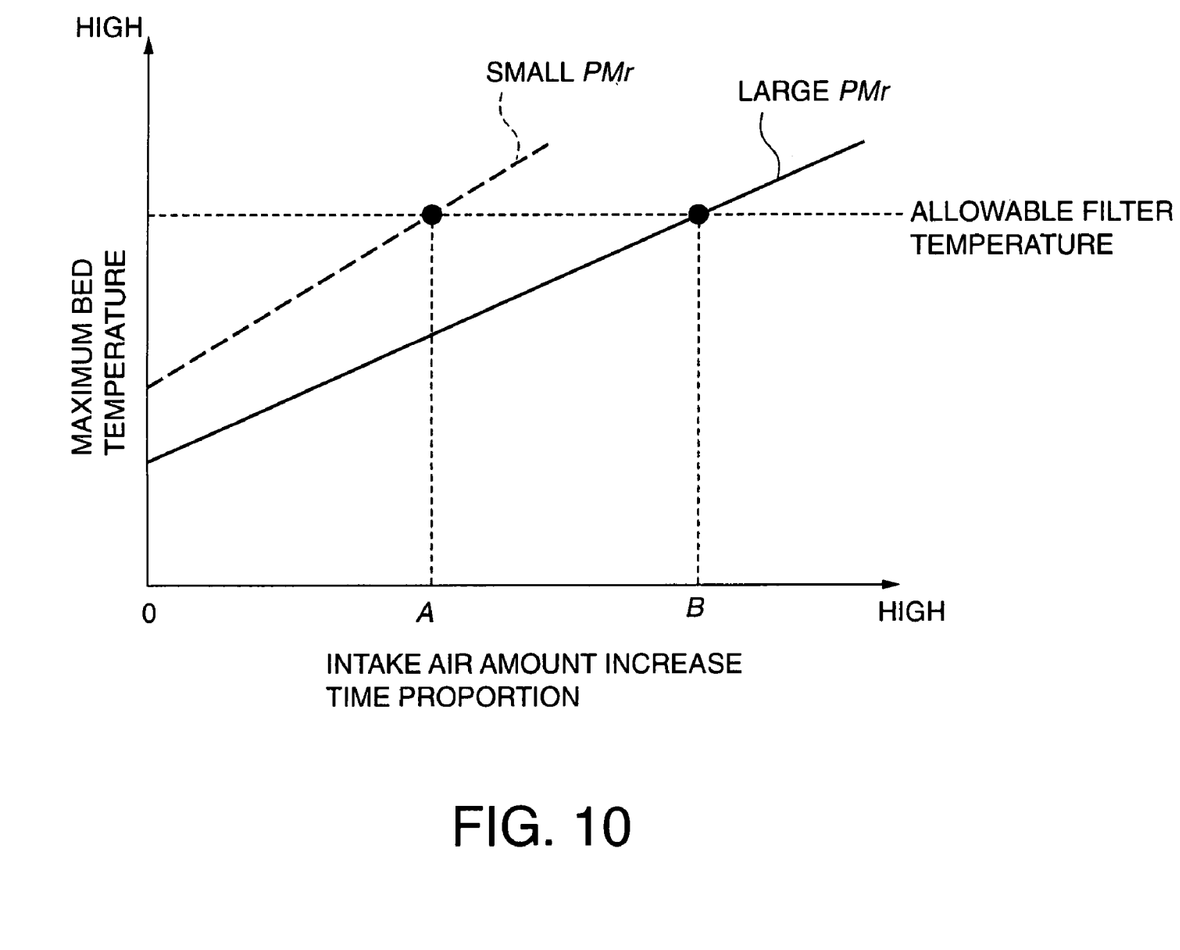
FIG. 10 is a diagram showing the characteristics of a map of an intake air amount increase time proportion, which is stored by the controller.

Referring to FIG. 10, when the particulate matter combustion amount PMr is constant, the maximum bed temperature of the DPF 41 rises as the intake air amount increase time proportion increases. When the intake air amount increase time proportion is constant, the maximum temperature of the DPF 41 rises as the particulate matter combustion amount PMr decreases.

Figure 12:
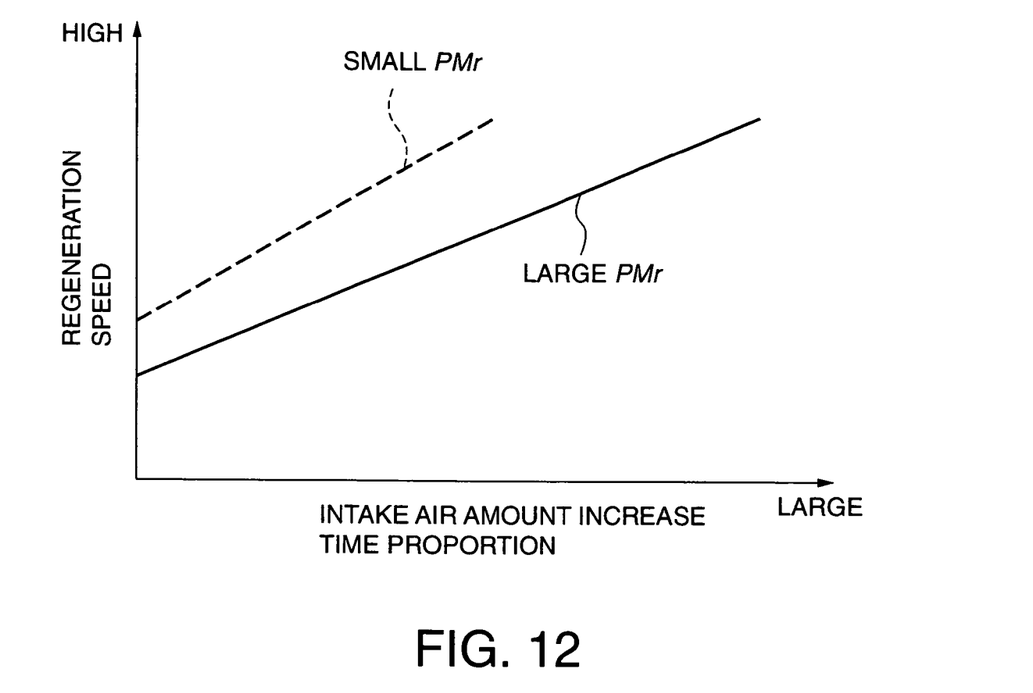
FIG. 12 is a diagram illustrating the relationship between the intake air amount increase time proportion and a particulate matter regeneration speed.

FIG. 12 is a diagram in which the maximum bed temperature of the DPF 41 in FIG. 10 is replaced by the combustion speed of the particulate matter, or in other words the regeneration speed of the DPF 41. As shown in the diagram, when the particulate matter combustion amount PMr is constant, the particulate matter combustion speed rises as the intake air amount increase time proportion increases.

As can be seen from these diagrams, when the intake air amount increase time proportion is increased such that the maximum bed temperature of the DPF 41 rises, the combustion speed of the particulate matter trapped in the DPF 41 increases, and regeneration of the DPF 41 is accelerated. When the maximum bed temperature of the DPF 41 exceeds the allowable filter temperature value, however, the heat resistance performance of the DPF 41 is adversely affected.

In FIG. 10, a line indicating the relationship between the intake air amount increase time proportion and the maximum bed temperature is selected on the basis of the particulate matter combustion amount PMr, and the intake air amount increase time proportion corresponding to the point of intersection between the selected line and the broken line of the allowable filter temperature value is determined. By applying this intake air amount increase time proportion, the fastest particulate matter combustion speed within a range not exceeding the allowable filter temperature value can be realized. According to this method, an intake air amount increase time proportion A employed when the particulate matter combustion amount PMr is large exceeds an intake air amount increase time proportion B employed when the particulate matter combustion amount PMr is small.

FIG. 13 shows the relationship between the particulate matter combustion amount PMr and the intake air amount increase time proportion when the maximum bed temperature of the DPF 41 is equal to the allowable filter temperature value. As noted above, the engine controller 31 determines the intake air amount increase time proportion from the particulate matter combustion amount PMr by referring to a map corresponding to FIG. 13.

To realize the intake air amount increase time proportion determined in the step S33, the engine controller 31 operates the intake throttle 42 and/or the variable nozzle 24 of the variable capacity turbocharger 21 in the step S34. Following the processing of the step S34, the engine controller 31 ends the routine. By operating the variable nozzle 24 and/or the intake throttle 42, the intake air amount of the diesel engine 1 is increased, and as a result, the oxygen concentration of the exhaust gas discharged from the diesel engine 1 rises. The variable nozzle 24 and/or intake throttle 42 constitute the claimed exhaust gas oxygen concentration regulating mechanism.

By executing this routine, the intake air amount increase time proportion gradually increases from the point A to the point B in FIG. 10, for example, as the particulate matter combustion amount PMr in the DPF 41 increases due to regeneration of the DPF 41. As a result, the maximum bed temperature of the DPF 41 is held to the allowable filter temperature value regardless of the particulate matter combustion amount PMr, and the particulate matter combustion speed is maintained at the maximum speed for the applied condition at all times. Thus the regeneration period can be shortened without affecting the heat resistance performance of the DPF 41.

Figure 14:
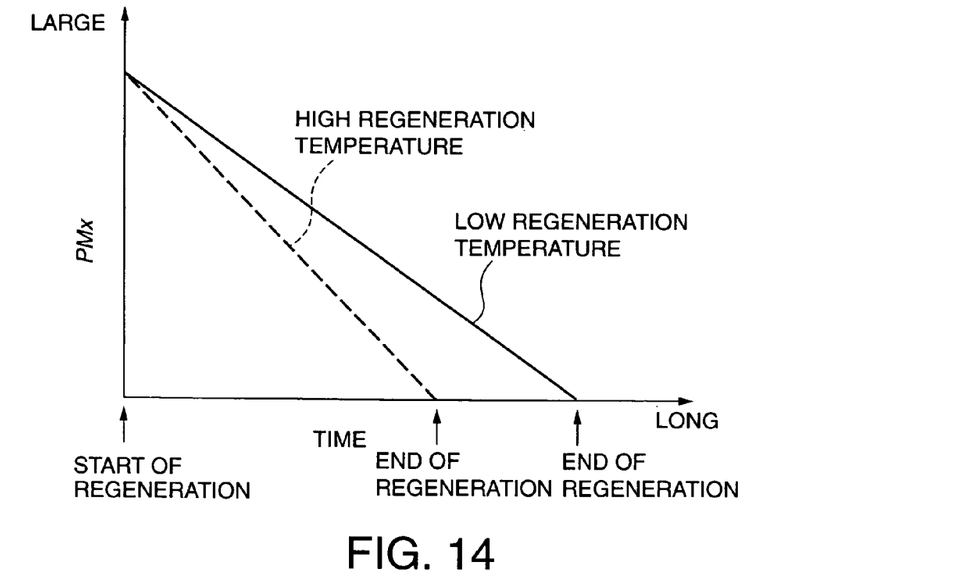
FIG. 14 is a diagram illustrating the relationship between a DPF regeneration temperature and a required regeneration time.
Figure 15:
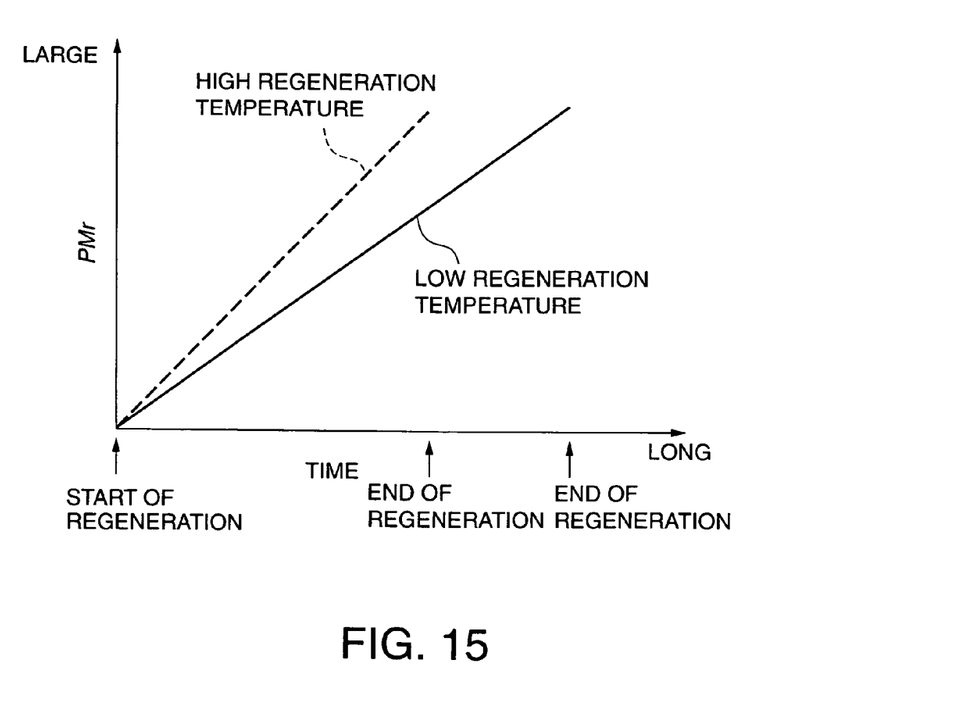
FIG. 15 is a diagram illustrating the relationship between the DPF regeneration temperature and the particulate matter combustion amount.

Conversely, if the intake air amount increase time proportion is fixed at the point A in FIG. 10 throughout regeneration processing of the DPF 41, the maximum bed temperature of the DPF 41 gradually falls as the particulate matter combustion amount PMr increases. As the maximum bed temperature of the DPF 41 falls, the time required to complete regeneration of the DPF 41 lengthens, as shown in FIGS. 14 and 15. According to this invention, regeneration is begun in the state shown by the solid lines in FIGS. 14 and 15, but as the particulate matter combustion amount PMr increases, the bed temperature of the DPF 41 nears the state shown by the broken lines in the diagrams, and hence the time required to regenerate the DPF 41 can be shortened. By shortening the time required for regeneration, the amount of fuel consumed by the diesel engine 1 to perform regeneration can be reduced.

The contents of Tokugan 2003-409139, with a filing date of Dec. 8, 2003 in Japan, are hereby incorporated by reference.

Although the invention has been described above by reference to certain embodiments of the invention, the invention is not limited to the embodiments described above. Modifications and variations of the embodiments described above will occur to those skilled in the art, within the scope of the claims.

For example, in the above embodiment, the residual particulate matter amount PMx is calculated from the particulate matter combustion amount PMr, but the residual particulate matter amount PMx may be determined directly.

Further, in the above embodiment the trapped particulate matter amount PMi in the DPF 41 is estimated on the basis of the differential pressure detected by the differential pressure sensor 36, but the trapped particulate matter amount PMi may be determined using another method.

Various devices, such as a device which supplies secondary air to the exhaust gas, may be applied as the exhaust gas oxygen concentration regulating mechanism instead of the variable nozzle 24 and/or intake throttle 42.

Figure 2:
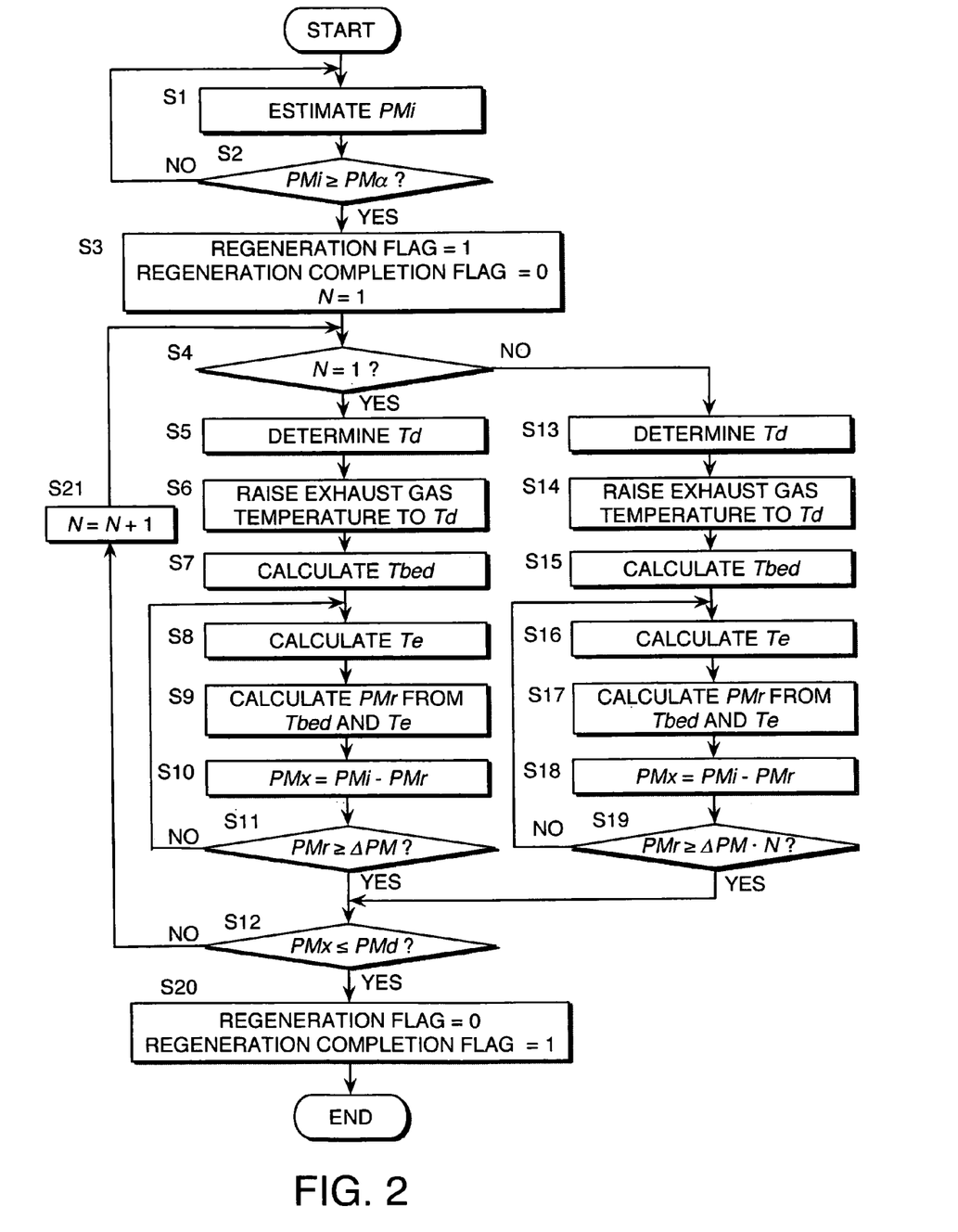
FIG. 2 is a flowchart illustrating a DPF regeneration routine executed by an engine controller according to this invention.
Figure 9:
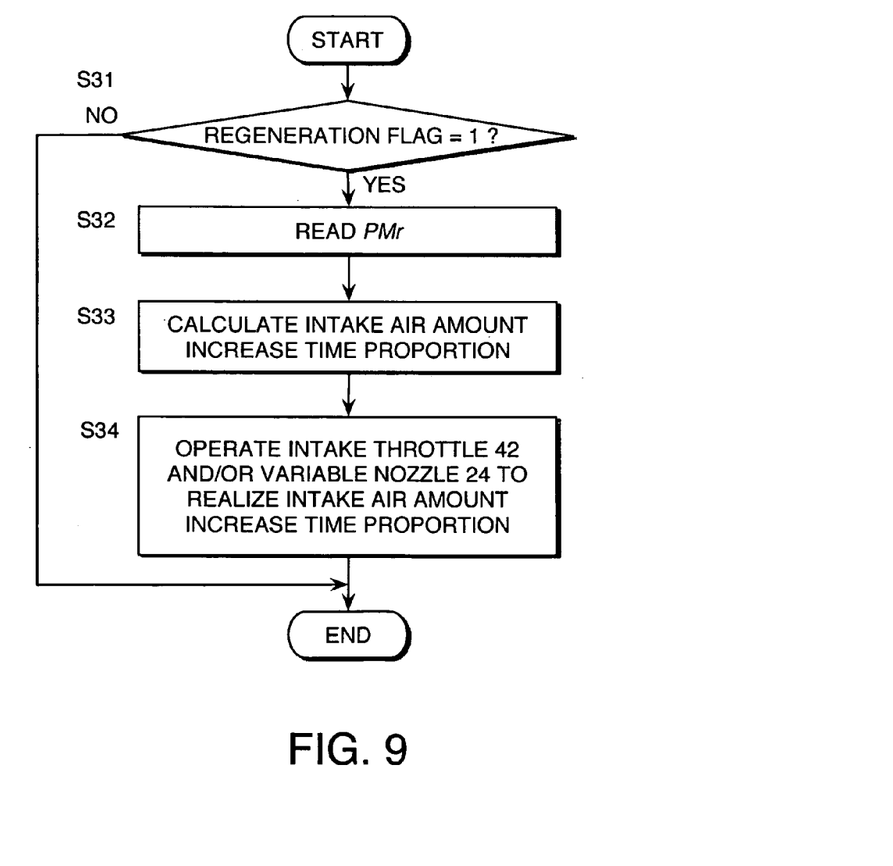
FIG. 9 is a flowchart illustrating an intake air amount control routine executed by the controller.

The sensors which detect the parameters required to execute the routines in FIGS. 2 and 9 are not limited to the sensors described in the above embodiment, and these parameters may be obtained by any method. This invention is not dependent on a method of obtaining parameters, and may be applied to any DPF regeneration device or method for executing the claimed control using parameters.

The embodiments of this invention in which an exclusive property or privilege is claimed are defined as:

1. A regeneration device for a diesel particulate filter which traps a particulate matter contained in an exhaust gas of a diesel engine, the diesel particulate filter being regenerated by burning the trapped particulate matter under a predetermined temperature condition, the regeneration device comprising:
   a mechanism which regulates an oxygen concentration of the exhaust gas of the diesel engine; and
   a programmable controller programmed to:
   estimate a combustion amount of the particulate matter trapped in the filter; and
   increase the oxygen concentration of the exhaust gas as the combustion amount increases, by increasing or decreasing a proportion of a regeneration period of the filter that is occupied by an oxygen concentration increasing period during which the mechanism increases the oxygen concentration.

2. The regeneration device as defined in claim 1, wherein the controller is further programmed to control the mechanism such that a temperature of the filter does not exceeds a preset allowable value.

3. The regeneration device as defined in claim 1, wherein the regeneration device further comprises a sensor which detects the temperature of the filter, and the controller is further programmed to integrate times during which the temperature of the filter does not fall below a predetermined target temperature as an effective regeneration time, and estimate the combustion amount on the basis of the effective regeneration time.

4. The regeneration device as defined in claim 3, wherein the regeneration device further comprises a mechanism which raises the temperature of the filter, and a sensor which detects an exhaust gas pressure differential upstream and downstream of the filter, and the controller is further programmed to calculate a trapped particulate matter amount in the filter, set a target temperature of the filter during the regeneration period on the basis of the trapped particulate matter amount, and control the temperature raising mechanism to realize the target temperature.

5. The regeneration device as defined in claim 4, wherein the controller is further programmed to calculate the trapped particulate matter amount at a start point of regeneration of the filter and estimate the combustion amount such that the combustion amount increases as the trapped particulate matter amount at the regeneration start point increases.

6. The regeneration device as defined in claim 5, wherein the controller is further programmed to calculate a residual particulate matter amount in the filter by subtracting the combustion amount from the trapped particulate matter amount at the start point of regeneration of the filter, and control the mechanism such that the oxygen concentration of the exhaust gas increases in accordance with a reduction in the residual particulate matter amount.

7. The regeneration device as defined in claim 6, wherein the controller is further programmed to set the target temperature to rise in accordance with a reduction in the residual particulate matter amount.

8. The regeneration device as defined in claim 3, wherein the controller is further programmed to determine whether or not the temperature of the filter exceeds a particulate matter burnable temperature at which the particulate matter is burnable, which is lower than the target temperature, when the temperature of the filter falls below the target temperature, and combine a value, obtained by multiplying a time during which the filter temperature exceeds the particulate matter burnable temperature by a predetermined coefficient, with the time during which the filter temperature exceeds the target temperature, and integrate the resulting value as the effective regeneration time.

9. The regeneration device as defined in claim 8, wherein the controller is further programmed to set a plurality of temperature ranges between the burnable temperature and the target temperature, and reduce the coefficient as the temperature range becomes lower.

10. A regeneration method for a diesel particulate filter which traps a particulate matter contained in an exhaust gas of a diesel engine, the diesel particulate filter being regenerated by burning the trapped particulate matter under a predetermined temperature condition, and the diesel engine comprising a mechanism which regulates an oxygen concentration of the exhaust gas of the diesel engine, the regeneration method comprising:
estimating a combustion amount of the particulate matter trapped in the filter; and
increasing the oxygen concentration of the exhaust gas as the combustion amount increases, by increasing or decreasing a proportion of a regeneration period of the filter that is occupied by an oxygen concentration increasing period during which the mechanism increases the oxygen concentration.

11. A regeneration device for a diesel particulate filter which traps particulate matter contained in an exhaust gas of a diesel engine, the diesel particulate filter being regenerated by burning the trapped particulate matter under a predetermined temperature condition, the regeneration device comprising:
a mechanism which regulates an oxygen concentration of the exhaust gas of the diesel engine;
a sensor which detects the temperature of the filter; and
a programmable controller programmed to:
integrate times during which the temperature of the filter does not fall below a predetermined target temperature as an effective regeneration time;
estimate a combustion amount of the particulate matter trapped in the filter on the basis of the effective regeneration time; and
control the mechanism such that the oxygen concentration of the exhaust gas increases as the combustion amount increases.

12. The regeneration device as defined in claim 11, wherein the controller is further programmed to control the mechanism such that a temperature of the filter does not exceeds a preset allowable value.

13. The regeneration device as defined in claim 11, wherein the controller is further programmed to regulate the oxygen concentration of the exhaust gas by increasing or decreasing a proportion of a regeneration period of the filter that is occupied by an oxygen concentration increasing period during which the mechanism increases the oxygen concentration.

14. The regeneration device as defined in claim 11, wherein the regeneration device further comprises a mechanism which raises the temperature of the filter, and a sensor which detects an exhaust gas pressure differential upstream and downstream of the filter, and the controller is further programmed to calculate a trapped particulate matter amount in the filter, set a target temperature of the filter during the regeneration period on the basis of the trapped particulate matter amount, and control the temperature raising mechanism to realize the target temperature.

15. The regeneration device as defined in claim 14, wherein the controller is further programmed to calculate the trapped particulate matter amount at a start point of regeneration of the filter and estimate the combustion amount such that the combustion amount increases as the trapped particulate matter amount at the regeneration start point increases.

16. The regeneration device as defined in claim 15, wherein the controller is further programmed to calculate a residual particulate matter amount in the filter by subtracting the combustion amount from the trapped particulate matter amount at the start point of regeneration of the filter, and control the mechanism such that the oxygen concentration of the exhaust gas increases in accordance with a reduction in the residual particulate matter amount.

17. The regeneration device as defined in claim 16, wherein the controller is further programmed to set the target temperature to rise in accordance with a reduction in the residual particulate matter amount.

18. The regeneration device as defined in claim 11, wherein the controller is further programmed to determine whether or not the temperature of the filter exceeds particulate matter burnable temperature at which the particulate matter is burnable, which is lower than the target temperature, when the temperature of the filter falls below the target temperature, and combine a value, obtained by multiplying a time during which the filter temperature exceeds the particulate matter burnable temperature by a predetermined coefficient, with the time during which the filter temperature exceeds the target temperature, and integrate the resulting value as the effective regeneration time.

19. The regeneration device as defined in claim 18, wherein the controller is further programmed to set a plurality of temperature ranges between the burnable temperature and the target temperature, and reduce the coefficient as the temperature range becomes lower.

20. A regeneration method for a diesel particulate filter which traps particulate matter contained in an exhaust gas of a diesel engine, the diesel particulate filter being regenerated by burning the trapped particulate matter under a predetermined temperature condition, and the diesel engine comprising a mechanism which regulates an oxygen concentration of the exhaust gas of the diesel engine, the regeneration method comprising:
detecting the temperature of the filter;
integrating times during which the temperature of the filter does not fall below a predetermined target temperature as an effective regeneration time;
estimating a combustion amount of the particulate matter trapped in the filter on the basis of the effective regeneration time; and
controlling the mechanism such that the oxygen concentration of the exhaust gas increases as the combustion amount increases.

* * * * *